(12) United States Patent
Vamaraju et al.

(10) Patent No.: US 10,142,781 B2
(45) Date of Patent: Nov. 27, 2018

(54) METHODS AND SYSTEMS FOR A RANGING PROTOCOL

(71) Applicant: QUALCOMM Incorporated, San Diego, CA (US)

(72) Inventors: Santosh Vamaraju, San Jose, CA (US); Carlos Horacio Aldana, Mountain View, CA (US); Xiaoxin Zhang, Fremont, CA (US); Ravi Gidvani, Fremont, CA (US); Erik David Lindskog, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/370,502

(22) Filed: Dec. 6, 2016

(65) Prior Publication Data

US 2017/0215037 A1 Jul. 27, 2017

Related U.S. Application Data

(60) Provisional application No. 62/287,388, filed on Jan. 26, 2016.

(51) Int. Cl.
*H04W 4/02* (2018.01)
*H04L 5/00* (2006.01)
(Continued)

(52) U.S. Cl.
CPC .......... *H04W 4/023* (2013.01); *H04L 5/0055* (2013.01); *H04W 4/20* (2013.01); *H04W 64/00* (2013.01); *H04W 88/02* (2013.01)

(58) Field of Classification Search
CPC ... H04W 64/00; H04W 64/006; H04W 24/10; H04W 4/023; H04W 4/001; H04W 4/008; H04W 4/04; H04W 16/225; H04W 72/085; H04W 8/005; H04W 56/001; H04W 52/0209; H04W 84/12; H04W 88/04
(Continued)

(56) References Cited

U.S. PATENT DOCUMENTS

2015/0049716 A1* 2/2015 Gutierrez ............. H04W 84/12
370/329
2016/0007342 A1* 1/2016 Seok ................... H04B 7/0452
370/338
(Continued)

OTHER PUBLICATIONS

Aldana C., "FTM Parameters for 802.1AS," Jan. 18, 2016, pp. 2-14, XP055337368. Retrieved from the Internet: URL: http://www.ieee802.org/1/filesjpublic/docs2016/asrev-caldana-FTM-parameters-0116-v01.pdf [retrieved on Jan. 20, 2017].
(Continued)

*Primary Examiner* — Jean Gelin
(74) *Attorney, Agent, or Firm* — Hunter Clark PLLC

(57) ABSTRACT

Disclosed are methods, systems and devices for obtaining a range between devices based, at least in part, on an exchange of wireless messages. For example, wireless devices may obtain measurements of range based, at least in part, on an exchange fine timing measurement (FTM) messages. In one implementation, an initial FTM request message may be transmitted from a first wireless transceiver device to a second wireless transceiver device comprising one or more parameters indicative of a request for transmission of FTM messages in a particular format.

28 Claims, 8 Drawing Sheets

(51) Int. Cl.
*H04W 4/20* (2018.01)
*H04W 64/00* (2009.01)
*H04W 88/02* (2009.01)

(58) Field of Classification Search
USPC ..... 455/41.1, 41.2, 414.1, 417, 115.1, 115.2, 455/115.3, 513, 452.2
See application file for complete search history.

(56) References Cited

U.S. PATENT DOCUMENTS

| | | | | |
|---|---|---|---|---|
| 2016/0192137 A1* | 6/2016 | Steiner | ................ | H04W 64/003 455/456.2 |
| 2016/0345277 A1* | 11/2016 | Segev | ................ | H04W 56/001 |
| 2017/0041750 A1* | 2/2017 | Jose | ................ | G01S 5/0263 |
| 2017/0127412 A1* | 5/2017 | Amizur | ................ | G01S 5/00 |
| 2017/0171766 A1* | 6/2017 | Amizur | ................ | H04W 24/08 |
| 2017/0180933 A1* | 6/2017 | Steiner | ................ | H04W 4/023 370/329 |
| 2017/0188301 A1* | 6/2017 | Eyal | ................ | H04W 52/0209 |

OTHER PUBLICATIONS

IEEE: "IEEE P802.11—REVmctm/D5.0, Jan. 2016, Draft Standard for Information Technology Telecommunications and Information Exchange between Systems, Local and Metropolitan Area Networks—Specific Requirements, Part 11: Wireless LAN Medium Access Control (MAC) and Physical Layer (PHY) Specifications", Jan. 1, 2016 (Jan. 1, 2016), XP055337241, Retrieved from the Internet: URL: http://ieeexplore.ieee.org/stampPDF/getPDF.jsp?tp=&arnumber=7383204.

International Search Report and Written Opinion—PCT/US2016/069022—ISA/EPO—Mar. 28, 2017.

Stanton K., et al., "Addition of p802.11-MC Fine Timing Measurement (FTM) to p802.1AS-Rev: Tradeoffs and Proposals Rev 0.10, as-kbstanton-caldana-ftm-addition-to-1as-guiding-principles-and-proposal-0315-v10", IEEE Draft, AS-Kbstanton-Caldana-FTM-Addition-T0-1AS-Guiding-Principles-And-Proposal-0315-V10, IEEE-SA, Piscataway, NJ USA, vol. 802, No. v10, Mar. 9, 2015 (Mar. 9, 2015), XP068096407, pp. 1-22.

Venkatesan G., (Intel Corporation): "An Unified 802.11az Protocol, 11-16-1494-01-00az-an-unified-802-11az-protocol", IEEE Draft, 11-16-1494-01-00AZ-AN-Unified-802-11AZ-Protocol, IEEE-SA Mentor, Piscataway, NJ USA, vol. 802.11az, No. 1, Nov. 9, 2016 (Nov. 9, 2016), XP068110925, pp. 1-20. Retrieved from the Internet: URL: https://mentor.ieee.org/802.11/dcn/16/11-16-1494-01-00az-an-unified-802-11az-protocol.pptx.

Venkatesan G., (Intel): "Location Capabilities and Neighbor Report, 11-15-1419-01-000m-location-Capabilities-and-neighbor-report", IEEE Draft, 11-15-1419-01-000M-Location-Capabilities-And-Neighbor-Report, IEEE-SA Mentor, Piscataway, NJ USA, vol. 802.11m, No. 1, Nov. 11, 2015 (Nov. 11, 2015), XP068099405, pp. 1-7.

* cited by examiner

| Category | Public Action | Trigger | LCI Measurement Request (optional) | Location Civic Measurement Request (optional) | Fine Timing Measurement Parameters (optional) | Vendor IE (variable length) |
|---|---|---|---|---|---|---|
Octets: | 1 | 1 | 1 | variable | variable | variable | |

FIG. 5

| IE id (1 byte) | IE len (2 bytes) | Vendor IE FTM capabilities (1 or more bytes) |
|---|---|---|

FIG. 6

| FTM format | Bandwidth |
|---|---|
| HE | RU26 |
| HE | RU52 |
| HE | RU106 |
| HE | RU242 (20Mhz) |
| HE | RU484 (40Mhz) |
| HE | RU996 (80Mhz) |
| HE | Non-contiguous 80+80 |
| HE (separate RF LOs) | Contiguous 160 |
| HE (single RF LO) | Contiguous 160 |
| MU-MIMO DL | (across 20, 40, 80, 80+80, contiguous 160) |
| MU-MIMO UL | (across 20, 40, 80, 80+80, contiguous 160) |

FIG. 7

METHODS AND SYSTEMS FOR A RANGING PROTOCOL

CROSS-REFERENCE TO RELATED APPLICATIONS

This application claims the benefit of U.S. Provisional Application No. 62/287,388, entitled "Methods and Systems for a Ranging Protocol," filed Jan. 26, 2016, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location, or a range between two mobile devices, may be measured based, at least in part, on a measurement of a round trip time (RTT) measured between transmission of a first message from a first device to a second device and receipt of a second message at the first device transmitted in response to the first message.

SUMMARY

Briefly, one particular implementation is directed to a method, at a first wireless transceiver device, comprising: transmitting a fine timing measurement (FTM) request message from the first wireless transceiver device to a second wireless transceiver device, wherein the FTM request message comprising one or more parameters in a high efficiency (HE) format.

Another particular implementation is directed to a first wireless station (STA), comprising: a wireless transceiver; and a processor coupled to the wireless transceiver, the processor being configured to: initiate transmission of a fine timing measurement (FTM) request message from the first wireless transceiver device to a second STA comprising one or more parameters indicative of a request for transmission of FTM messages in a high efficiency (HE) format.

Another particular implementation is directed to a first wireless transceiver device, comprising: means for transmitting a fine timing measurement (FTM) request message from the first wireless transceiver device to a second wireless transceiver device comprising one or more parameters indicative of a request for transmission of FTM messages in a high efficiency (HE) format; and means for receiving an acknowledgement message transmitted from the second wireless transceiver device in response to the FTM request message.

Another particular implementation is directed to a non-transitory storage medium comprising computer readable instructions stored thereon which are executable by a processor of a first wireless transceiver device to initiate transmission of a fine timing measurement (FTM) request message from the first wireless transceiver device to a second STA comprising one or more parameters indicative of a request for transmission of FTM messages in a high efficiency (HE) format.

Another particular implementation is directed to a method, at a first wireless transceiver device, comprising: receiving a fine timing measurement (FTM) request message transmitted from a second wireless transceiver device comprising one or more parameters in a high efficiency (HE) format.

Another particular implementation is directed to a first wireless station (STA), comprising: a wireless transceiver; and a processor coupled to the wireless transceiver, the processor being configured to: obtain an initial fine timing measurement (FTM) request message received at the wireless transceiver and transmitted by a second STA comprising one or more parameters indicative of a request for transmission of FTM messages in an HE format.

Another particular implementation is directed to a first wireless transceiver device, comprising: means for receiving an initial fine timing measurement (FTM) request message transmitted from a second wireless transceiver device comprising one or more parameters indicative of a request for transmission of FTM messages in an HE format; and means for transmitting an acknowledgement message to the second wireless transceiver device in response to the initial FTM request message.

Another particular implementation is directed to a non-transitory storage medium comprising computer readable instructions stored thereon which are executable by a processor of a first wireless transceiver device to: obtain an initial fine timing measurement (FTM) request message received at the first wireless transceiver device and transmitted from a second STA comprising one or more parameters indicative of a request for transmission of FTM messages in an HE format.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 5 and 6 show fields of a message transmitted between wireless transceiver devices according to an embodiment;

FIG. 7 is a table illustrating possible fine timing measurement (FTM) formats and bandwidths that may be specified according to an embodiment;

Figure 1:
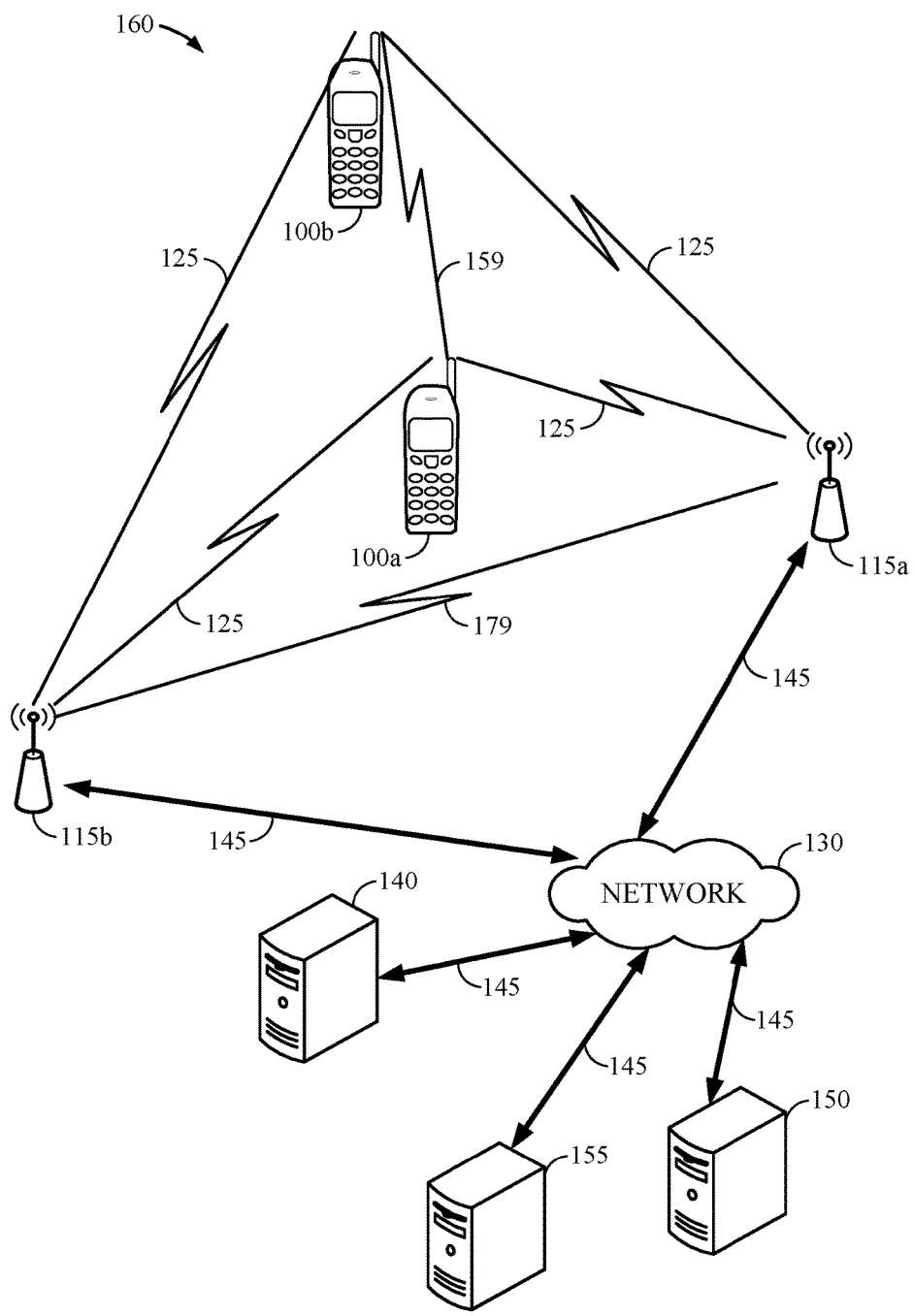
FIG. 1 is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As discussed below, particular message flows may enable effective and efficient measurements of a range in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining round-trip time (RTT) or time of flight (TOF) measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT or TOF measurement. In a particular implementation, the fine timing measurement request message may include an indication as to whether the first STA is capable of sharing ranging measurements or other parameters indicative of range. In a particular implementation, subsequent to computation of an RTT or TOF measurement, the first STA may transmit one or more messages to the second STA comprising a computed range, TOF or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a TOF for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

Physical layer signaling formats proposed for frames in IEEE std. 802.11 related transactions include frame formats in the so-called "High Efficiency" (HE) format as set forth in IEEE document IEEE 802.11-15/0132r13 in which a frame or message may comprise a legacy preamble (L-STF, L-LTF and L-SIG) duplicated on each 20 MHz channel and both first and second OFDM symbols immediately following an L-SIG portion use BPSK modulation. Embodiments described below are directed to incorporation of frames transmitted in the HE format for use in computing parameters indicative of ranges between devices.

According to an embodiment, as shown in FIG. 1, mobiles device 100*a* or 100*b* may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115*a* or 115*b* may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprise TOF, AoA, SI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D6.0 Draft Standard 802.11 for Information technology—Telecommunications and information exchange between systems, Local and metropolitan area networks—Specific requirements Part 11: Wireless LAN Medium Access Control (MAC) and Physical Layer (PHY), Jun. 2016, section 10.23.6 (hereinafter "IEEE std. 802.11"). Indeed, it should be understood that some features described herein are not shown, described or taught in the IEEE std. 802.11.

Figure 2:
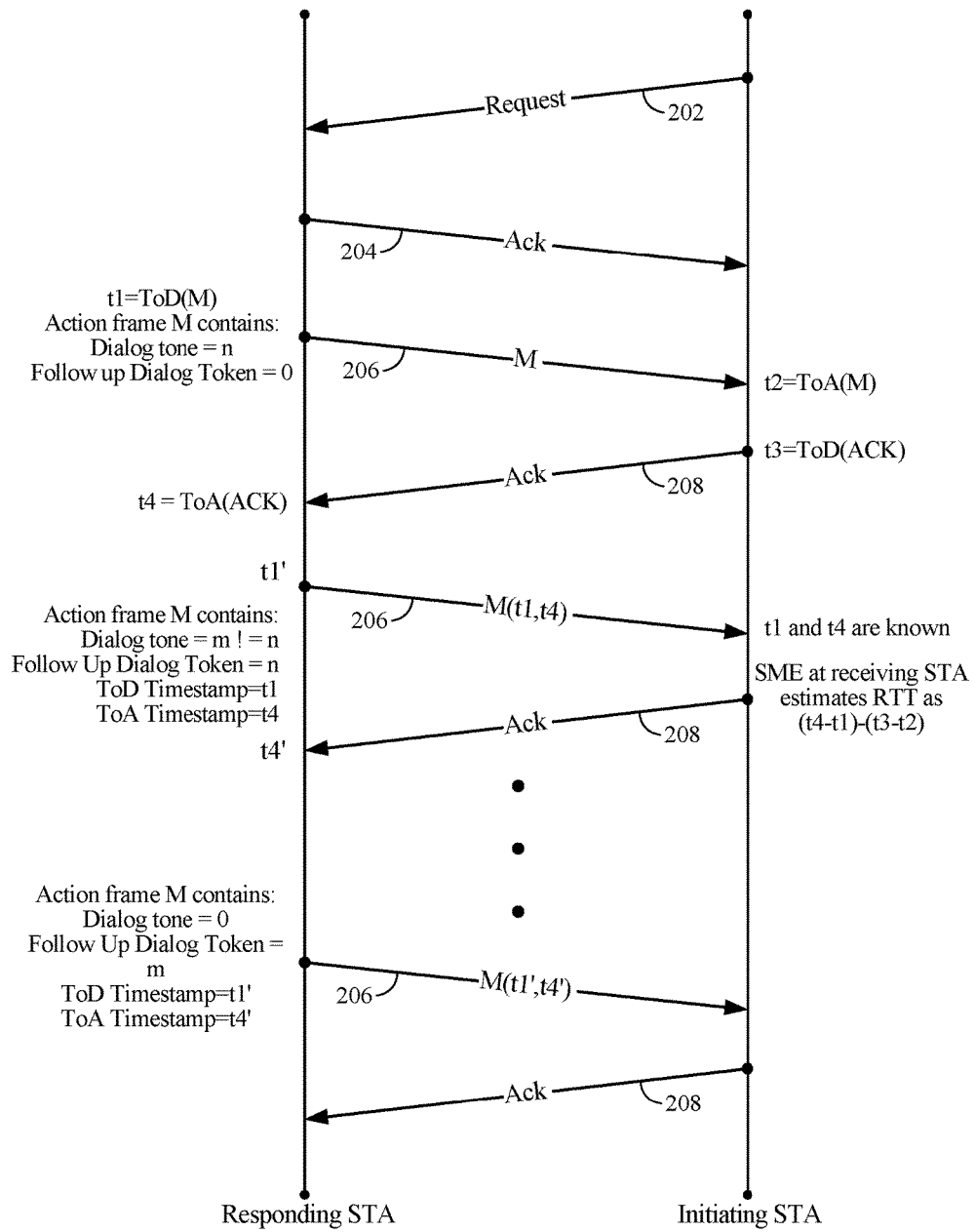
FIGS. 2 and 3 are message flow diagrams according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2,t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In this context, an "FTM message" as referred to herein means a message transmitted from a first device to a second device comprising at least one field having a precise indication of a time of transmission from the first device. As discussed above, such a field indicating at time of transmission of the FTM message may permit the recipient second device to compute one or more parameters indicative of a range between the first and second devices. An FTM message transmitted by the first device may be initiated by receipt of an FTM request message transmitted by the second device. In this context, an "FTM request message" as referred to herein means a message transmitted to the first device requesting transmission of one or more FTM messages to the second device.

In a particular implementation, while not limiting claimed subject matter in this respect, contents of such a fine timing measurement message or frame may be as shown in the IEEE std. 802.11. In one example implementation, an initiating STA may compute an RTT measurement as (t4-1)-(t3-t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

FTM request messages and FTM messages may be transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF=RTT/2 based on a different between the time stamp value and an instance that the particular symbol is decoded or detected.

In a particular implementation, IEEE std. 802.11 may provide a way for a device measure the Round Trip Time (RTT) with another device using the Fine Timing measurement procedure using different signaling formats. One signaling format for transmitting frames comprises the so-called "High Efficiency" (HE) format defined, at least in part, by a legacy preamble (e.g., L-STF, L-LTF and L-SIG) duplicated on each 20 MHz for backward compatibility with legacy devices proposed in IEEE 802.11ax Specification Framework for TGax, Dec. 7, 2015 [IEEE 802.11-15/0132r13]. According to an embodiment, a responding STA may transmit FTM messages to an initiating STA in a session to exchange FTM messages in any one of several FTM formats such as, for example, high throughput (HT), non-HT, HT/HT-mixed, (very high throughput (VHT) format by the means of the FTM format and bandwidth field in the FTM parameter information element. In this context, as referred to herein a "frame" or "message" transmitted in a "high efficiency" or "HE" format means a frame or message transmitted at a physical layer with a legacy preamble (e.g., a legacy preamble as employed with HT, non-HT, HT/HT-mixed or VHT formats) on 20 MHz channels, but with OFDM symbols immediately following an L-SIG portion of the preamble using BPSK modulation.

FTM messages transmitted in the HE format may take advantage of an increased total symbol period (including longer guard intervals) to enable more accurate time measurements. In messages transmitted in the HE format, a number of tones may be higher compared to a number of tones in messages transmitted in non-HT/HT/VHT formats, improving channel estimation thereby resulting in better RTT accuracy performance. A longer guard interval (GI) may also improve performance in outdoor scenarios with long delay spread channels.

Figure 3:
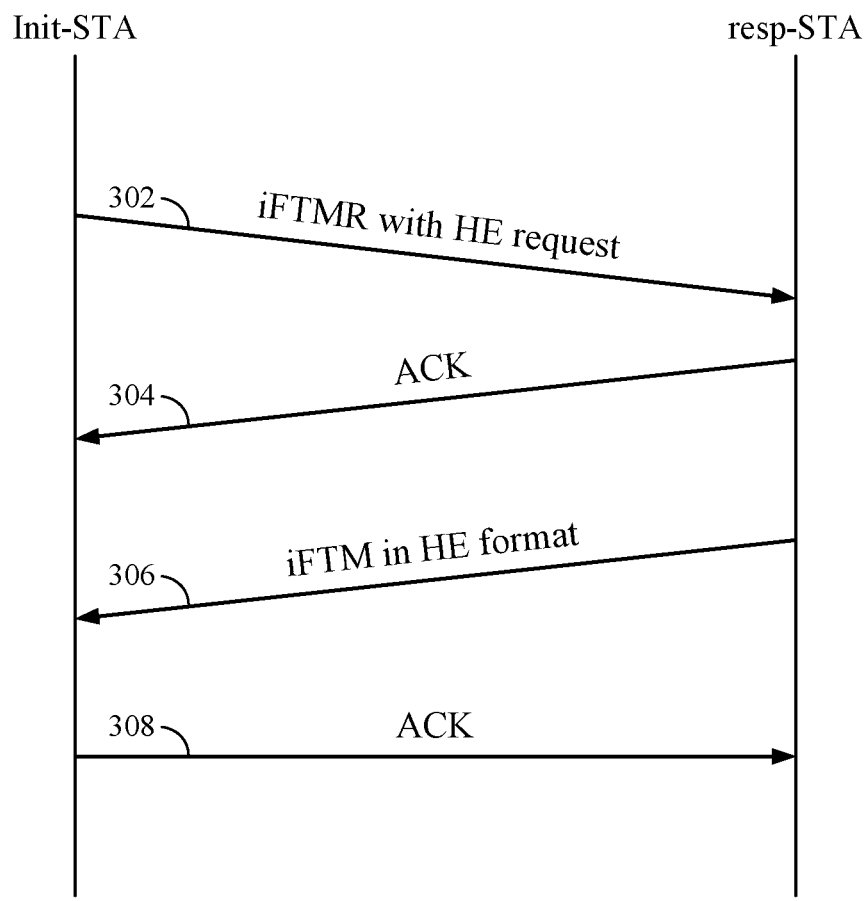

As illustrated in the message flow of FIG. 3, a responding STA may transmit FTM messages in the HE format. An initiating STA may transmit an initial FTM request (iFTMR) message 302 to a responding STA comprising one or more parameters requesting transmission of one or more FTM messages in the HE format. In response to receipt of iFTMR message 302, the responding STA may transmit an initial FTM (iFTM) message 306 with one or more parameters indicating whether the responding STA will attempt to transmit subsequent FTM messages in the HE format. In an alternative implementation, iFTM message 306 may comprise one or more parameters requesting that subsequent ACK messages (e.g., ACK message 308) be transmitted in the HE format.

Figure 4A:
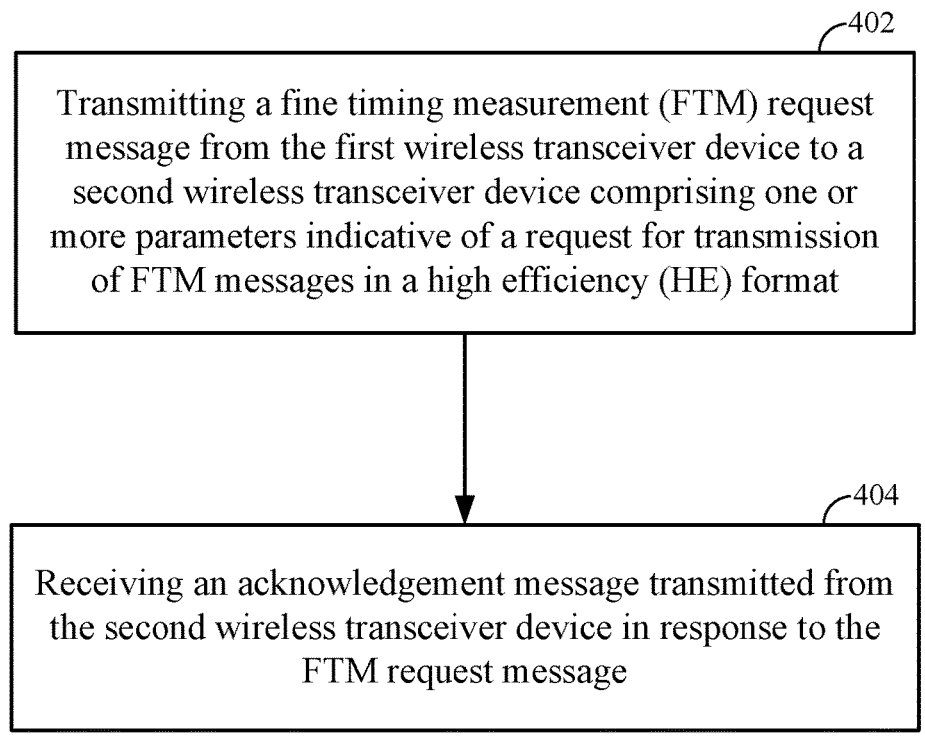
FIGS. 4A and 4B are flow diagrams of processes to transmit and receive messages according to particular embodiments.
Figure 4B:
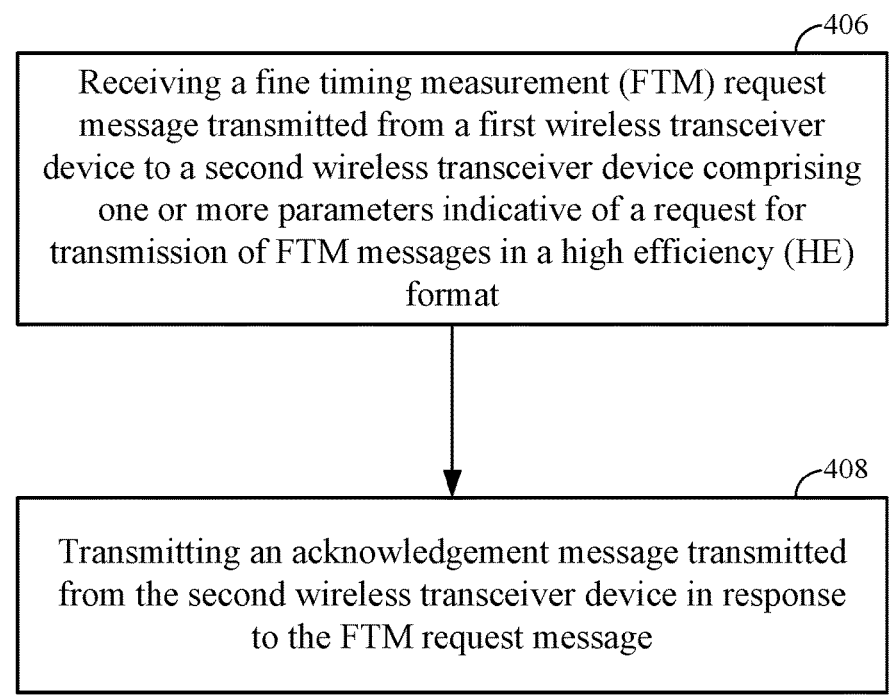

FIGS. 4A and 4B are flow diagrams of processes for exchange of an FTM request message and an acknowledgement message transmitted in response to the FTM request message. Block 402 comprises transmitting an iFTMR message (e.g., iFTMR message 302) from a first wireless transceiver device comprising one or more parameters indicating a preference or request from transmission of FTM messages (e.g., a single FTM message or one or more bursts of FTM messages) in an HE format. The iFTMR message transmitted at block 402 may be received by a second wireless transceiver device at block 406 and, in response to receipt of the iFTMR message, the second wireless transceiver device may transmit an acknowledgement message (e.g., acknowledgement message ACK message 308).

In one embodiment, parameters in iFTMR message 302 may indicate a request for transmission of subsequent FTM messages in the HE format using one or more proprietary data fields. FIG. 5 shows fields in a payload portion of an iFTMR message including a "Vendor IE" field. FIG. 6 shows an implementation of field "Vendor IE" to provide an element including a first byte indicating an identifier of the element, two bytes indicating a length of the element (e.g., in bytes) and requested FTM capabilities such as a capability of transmitting subsequent FTM messages in the HE format (e.g., by setting one or more bits to request FTM messages in the HE format).

In a particular implementation, iFTM message 306 may have fields in a payload as shown in FIG. 5. Accordingly, responsive to iFTMR message 302, a responding STA may indicate that it is satisfying a request for FTM messages in HE format by mirroring parameters in field "Vendor IE" of iFTMR message 302 in a corresponding "Vendor IE" field in a payload of iFTM message 306.

In an alternative to indicating a request for FTM messages in HE format using parameters according to a proprietary format (e.g., as illustrated in FIGS. 6 and 7), iFTMR message 302 may indicate such a request for FTM messages in HE format using message parameters provided by or defined according to a standard. For example, reserved values in the FTM format and bandwidth field in iFTMR 302 may be used to specify a request for subsequent FTM messages in an HE format. As shown in the table of FIG. 7, any one of several combinations of FTM format and bandwidth may be specified in parameters requesting FTM messages in HE format.

Figure 8:
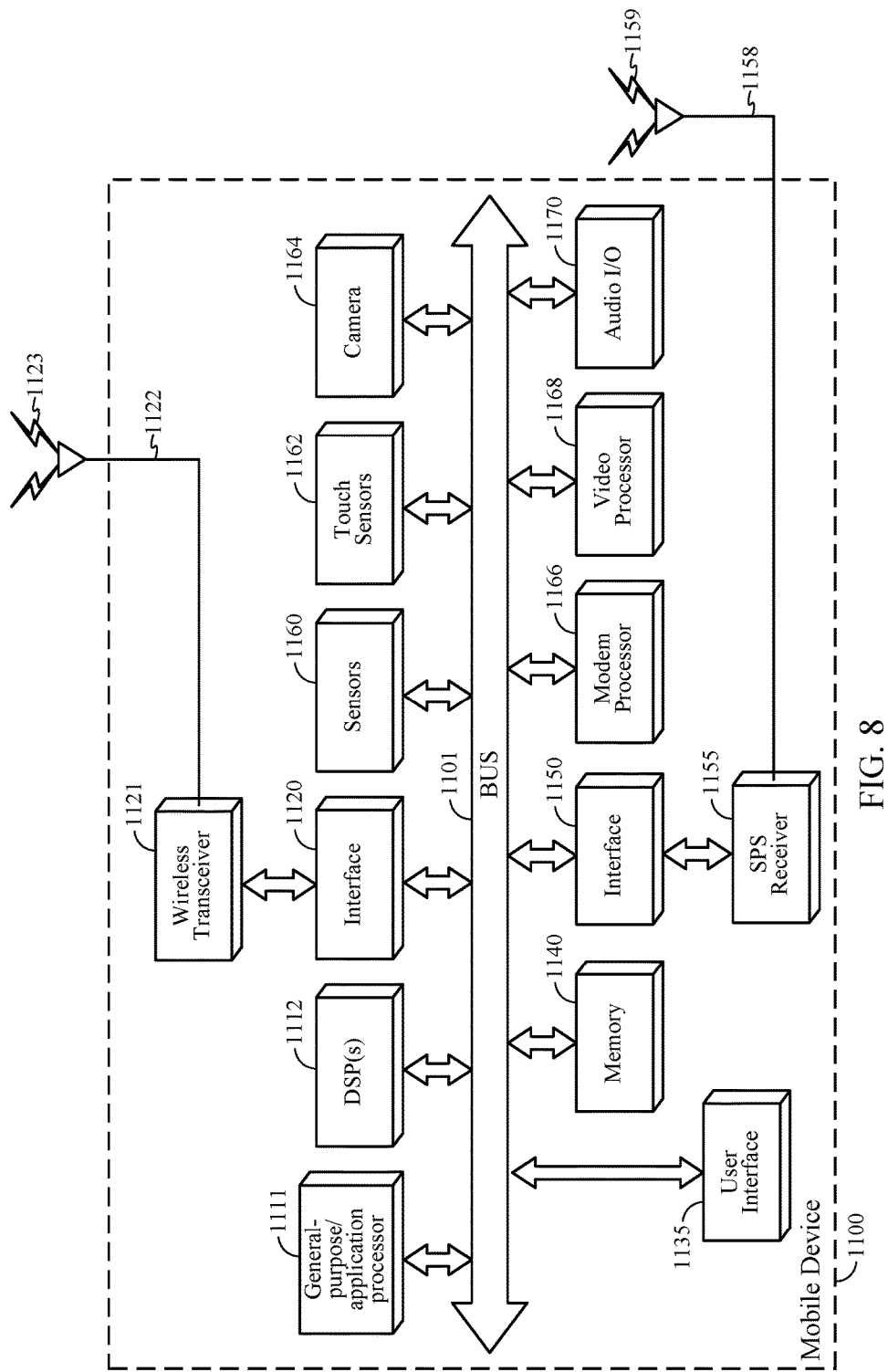
FIG. 8 is a schematic block diagram illustrating an exemplary device, in accordance with an implementation.
Figure 9:
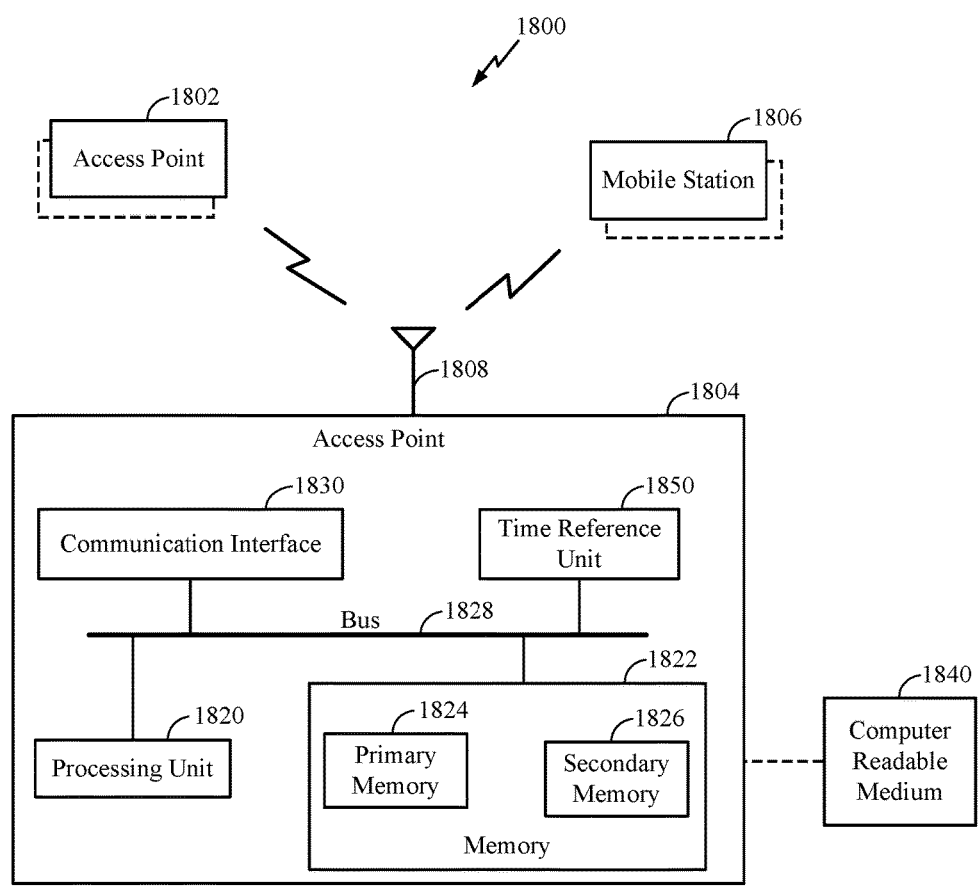
FIG. 9 is a schematic block diagram of an example computing system in accordance with an implementation.

Subject matter shown in FIGS. 8 and 9 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 2 through 7 and corresponding text of the present disclosure.

FIG. 8 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 8, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 2 through 7.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of data structures that may perform baseband processing, and that claimed subject matter is not limited in this respect.

FIG. 9 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 9, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system, a router or a network attached storage (NAS) device; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 9, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 9, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 2 through 7.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 2 through 7.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

As discussed above, a particular embodiment is directed to a method, at a first wireless transceiver device, comprising: receiving a fine timing measurement (FTM) request message transmitted from a second wireless transceiver device comprising one or more parameters in a high efficiency (HE) format. In a particular implementation, the one or more parameters are in a Vendor IE field of a payload of the FTM request message. In another particular implementation, the one or more parameters are in one or more FTM format and bandwidth fields. In another particular implementation, the method further comprises transmitting one or more FTM messages in response to the FTM request message, at least one of the FTM messages comprising one or more parameters requesting that the second wireless transceiver device transmit acknowledgement messages in the HE format. In yet another particular implementation, the method further comprises receiving wireless acknowledgement messages transmitted in the HE format responsive to the one or more parameters requesting transmission of the acknowledgement messages in the HE format.

As discussed above, another particular embodiment is directed to a first wireless station (STA), comprising: a wireless transceiver; and a processor coupled to the wireless transceiver, the processor being configured to: obtain an initial fine timing measurement (FTM) request message received at the wireless transceiver and transmitted by a second STA comprising one or more parameters indicative of a request for transmission of FTM messages in an HE format. In a particular implementation, the one or more parameters are in a Vendor IE field of a payload of the FTM request message. In another particular implementation, the one or more parameters are in one or more FTM format and bandwidth fields. In another particular implementation, the processor is further configured to initiate transmission of the one or more FTM messages through the wireless transceiver in response to the FTM request message, at least one of the FTM messages comprising one or more parameters requesting that the second wireless transceiver device transmit acknowledgement messages in the HE format. In yet another particular implementation, the processor is further configured to obtain acknowledgement messages received at the wireless transceiver and transmitted in the HE format responsive to the one or more parameters requesting transmission of the acknowledgement messages in the HE format.

As discussed above, another particular embodiment is directed to a first wireless transceiver device, comprising: means for receiving an initial fine timing measurement (FTM) request message transmitted from a second wireless transceiver device comprising one or more parameters indicative of a request for transmission of FTM messages in an HE format; and means for transmitting an acknowledgement message to the second wireless transceiver device in response to the initial FTM request message. In a particular implementation, the one or more parameters are in a Vendor IE field of a payload of the FTM request message. In another particular implementation, the one or more parameters are in one or more FTM format and bandwidth fields. In another particular implementation, the first wireless transceiver device further comprises means for transmitting one or more FTM messages in response to the FTM request message, at least one of the FTM messages comprising one or more parameters requesting that the second wireless transceiver device transmit acknowledgement messages in the HE format. In yet another particular implementation, the first wireless transceiver device further comprises means for receiving wireless acknowledgement messages transmitted in the HE format responsive to the one or more parameters requesting transmission of the acknowledgement messages in the HE format.

As discussed above, another particular embodiment is directed to a non-transitory storage medium comprising computer readable instructions stored thereon which are executable by a processor of a first wireless transceiver device to: obtain an initial fine timing measurement (FTM) request message received at the first wireless transceiver device and transmitted from a second STA comprising one or more parameters indicative of a request for transmission of FTM messages in an HE format. In a particular implementation, the one or more parameters are in a Vendor IE field of a payload of the FTM request message. In another particular implementation, the one or more parameters are in one or more FTM format and bandwidth fields. In another particular implementation, the instructions are further executable to initiate transmission of one or more FTM messages in response to the FTM request message, at least one of the FTM messages comprising one or more parameters requesting that the second wireless transceiver device transmit acknowledgement messages in the HE format. In yet another particular implementation, the instructions are further executable to obtain acknowledgement messages received at the first wireless transceiver device and transmitted in the HE format responsive to the one or more parameters requesting transmission of the acknowledgement messages in the HE format.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, terms, numbers, numerals, expressions, messages, fields, identifiers frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with a WWAN, WLAN or WPAN, or any combination thereof. Also, particular examples are described above in connection with an implementation in a WLAN. It should be understood, however, that features described above may also be implemented in a WWAN or WPAN without deviating from claimed subject matter.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At a first wireless transceiver device, a method comprising:
    transmitting a fine timing measurement (FTM) request message from the first wireless transceiver device to a second wireless transceiver device, wherein the FTM request message comprising one or more parameters requesting transmission of subsequent FTM messages from the second wireless transceiver device in a format having an increased symbol period, wherein the increased symbol period is longer than a symbol period of FTM messages transmitted in a high throughput (HT) format, non-HT format, HT/HT-mixed format or very high throughput format; and
    receiving an acknowledgement message transmitted from the second wireless transceiver device in response to the FTM request message.

2. The method of claim 1, wherein the one or more parameters are in a Vendor IE field of a payload of the FTM request message.

3. The method of claim 1, wherein the one or more parameters are in one or more FTM format and bandwidth fields.

4. The method of 1, and further comprising receiving one or more FTM messages transmitted in response to the FTM request message, at least one of the FTM messages comprising one or more parameters requesting that the first wireless transceiver device transmit acknowledgement messages in the format having the increased symbol period.

5. The method of claim 4, and further comprising transmitting the wireless transmit acknowledgement messages in the format having the increased symbol period responsive to the one or more parameters requesting transmission of the acknowledgement messages in the HE format having the increased symbol period.

6. The method of claim 1, and further comprising:
    receiving one or more FTM messages transmitted in response to the FTM request message; and
    computing one or more parameters indicative of a range between the first and second wireless transceiver devices based, at least in part, on a time of receipt of at least one of the one or more FTM messages.

7. The method of claim 1, wherein the format having the increased symbol period further specifies an increase in tones transmitted in a frame.

8. The method of claim 1, wherein the format having the increased symbol period further specifies an increased guard interval.

9. A first wireless station (STA), comprising:
    a wireless transceiver; and
    a processor coupled to the wireless transceiver, the processor being configured to:
    initiate transmission of a fine timing measurement (FTM) request message from the first wireless transceiver device to a second STA comprising one or more parameters indicative of a request for transmission of FTM messages from the second STA in a format having an increased symbol period, wherein the increased symbol period is longer than a symbol period of FTM messages transmitted in a high throughput (HT) format, non-HT format, HT/HT-mixed format or very high throughput format.

10. The first STA of claim 9, wherein the one or more parameters are in a Vendor IE field of a payload of the FTM request message.

11. The first STA of claim 9, wherein the one or more parameters are in one or more FTM format and bandwidth fields.

12. The first STA of claim 9, wherein the processor is further configured to obtain one or FTM messages received at the wireless transceiver in response to the initial FTM request message, at least one of the FTM messages comprising one or more parameters requesting that the first STA transmit acknowledgement messages in the format having the increased symbol period.

13. The first STA of claim 12, and wherein the processor is further configured to initiate transmission of the wireless transmit acknowledgement messages through the wireless transceiver in the format having the increased symbol period responsive to the one or more parameters requesting transmission of the acknowledgement messages in the format having the increased symbol period.

14. The first STA of claim 9, wherein the processor is further configured to:
    obtain one or more FTM messages received at the wireless transceiver and transmitted in response to the FTM request message; and
    compute one or more parameters indicative of a range between the first and second wireless transceiver devices based, at least in part, on a time of receipt of at least one of the one or more FTM messages.

15. A first wireless transceiver device, comprising:
    means for transmitting a fine timing measurement (FTM) request message from the first wireless transceiver device to a second wireless transceiver device comprising one or more parameters indicative of a request for transmission of FTM messages from the second wireless transceiver device in a format having an increased symbol period, wherein the increased symbol period is longer than a symbol period of FTM messages transmitted in a high throughput (HT) format, non-HT format, HT/HT-mixed format or very high throughput format; and
    means for receiving an acknowledgement message transmitted from the second wireless transceiver device in response to the FTM request message.

16. The first wireless transceiver device of claim 15, wherein the one or more parameters are in a Vendor IE field of a payload of the FTM request message.

17. The first wireless transceiver device of claim 15, wherein the one or more parameters are in one or more FTM format and bandwidth fields.

18. The first wireless transceiver device of 15, and further comprising means for receiving one or FTM messages transmitted in response to the FTM request message, at least one of the FTM messages comprising one or more parameters requesting that the first wireless transmit acknowledgement messages in the format having the increased symbol period.

19. The first wireless transceiver device of claim 18, and further comprising means for transmitting the wireless transmit acknowledgement messages in the format having the increased symbol period responsive to the one or more parameters requesting transmission of the acknowledgement messages in the format.

20. The first wireless transceiver device of claim 15, and further comprising:
    means for receiving one or more FTM messages transmitted in response to the FTM request message; and means for computing between the first and second wireless transceiver devices based, at least in part, on a time of receipt of at least one of the one or more FTM messages.

21. The first wireless transceiver device of claim 15, wherein the format having the increased symbol period further specifies an increase in tones transmitted in a frame.

22. The first wireless transceiver device of claim 15, wherein the format having the increased symbol period further specifies an increased guard interval.

23. A non-transitory storage medium comprising computer readable instructions stored thereon which are executable by a processor of a first wireless transceiver device to:
   initiate transmission of a fine timing measurement (FTM) request message from the first wireless transceiver device to a second STA comprising one or more parameters indicative of a request for transmission of FTM messages from the second STA in a format having an increased symbol period, wherein the increased symbol period is longer than a symbol period of FTM messages transmitted in a high throughput (HT) format, non-HT format, HT/HT-mixed format or very high throughput format.

24. The storage medium of claim 23, wherein the one or more parameters are in a Vendor IE field of a payload of the initial FTM request message.

25. The storage medium of claim 23, wherein the one or more parameters are in one or more FTM format and bandwidth fields.

26. The storage medium of claim 23, wherein the instructions are further executable by the processor to obtain one or FTM messages received at the wireless transceiver in response to the FTM request message, at least one of the FTM messages comprising one or more parameters requesting that the first STA transmit acknowledgement messages in the format having the increased symbol period.

27. The storage medium of claim 26, wherein the instructions are further executable by the processor to initiate transmission of the wireless transmit acknowledgement messages in the format having the increased symbol period responsive to the one or more parameters requesting transmission of the acknowledgement messages in the format having the increased symbol period.

28. The storage medium of claim 23, wherein the instructions are further executable by the processor to:
   obtain one or more FTM messages received at the first wireless transceiver device and transmitted in response to the FTM request message; and
   compute one or more parameters indicative of a range between the first and second wireless transceiver devices based, at least in part, on a time of receipt of at least one of the one or more FTM messages.

* * * * *